US012623461B2

(12) United States Patent
Shimizu et al.

(10) Patent No.: US 12,623,461 B2
(45) Date of Patent: May 12, 2026

(54) LIQUID EJECTION HEAD AND LIQUID EJECTION APPARATUS

(71) Applicant: CANON KABUSHIKI KAISHA, Tokyo (JP)

(72) Inventors: Naoko Shimizu, Kanagawa (JP); Yoshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 18/236,729

(22) Filed: Aug. 22, 2023

(65) Prior Publication Data

US 2024/0066877 A1 Feb. 29, 2024

(30) Foreign Application Priority Data

Aug. 23, 2022 (JP) ................................ 2022-132814

(51) Int. Cl.
*B41J 2/175* (2006.01)
*B41J 29/02* (2006.01)

(52) U.S. Cl.
CPC ............ *B41J 2/175* (2013.01); *B41J 29/023* (2013.01); *B41J 2202/12* (2013.01)

(58) Field of Classification Search
CPC ............... B41J 2202/12; B41J 2/14145; B41J 2002/14338; B41J 2/175
See application file for complete search history.

(56) References Cited

U.S. PATENT DOCUMENTS

| | | | | |
|---|---|---|---|---|
| 4,746,935 | A * | 5/1988 | Allen | H04N 1/034 347/56 |
| 8,833,916 | B2 * | 9/2014 | Hara | B41J 2/17563 347/92 |
| 10,391,767 | B2 | 8/2019 | Osaki et al. | |
| 10,668,736 | B2 | 6/2020 | Yamada et al. | |
| 11,850,855 | B2 | 12/2023 | Shimizu et al. | |
| 2007/0085881 | A1 * | 4/2007 | Cornell | B41J 2/14024 347/65 |
| 2011/0063350 | A1 * | 3/2011 | Kusunoki | B41J 2/04541 347/11 |
| 2012/0113197 | A1 * | 5/2012 | Kashu | B41J 2/1433 347/89 |
| 2013/0076835 | A1 * | 3/2013 | Oikawa | B41J 2/1404 347/54 |
| 2015/0124019 | A1 * | 5/2015 | Cruz-Uribe | B41J 29/393 347/18 |
| 2019/0001698 | A1 * | 1/2019 | Yamazaki | B41J 2/1404 |
| 2019/0092011 | A1 * | 3/2019 | Nakagawa | B41J 2/1404 |

(Continued)

FOREIGN PATENT DOCUMENTS

| | | |
|---|---|---|
| JP | 2011-131462 A | 7/2011 |
| JP | 2013-136239 A | 7/2013 |

(Continued)

OTHER PUBLICATIONS

Office Action dated Feb. 20, 2024, in Japanese Patent Application No. 2022-132814.

*Primary Examiner* — John P Zimmermann
(74) *Attorney, Agent, or Firm* — Venable LLP

(57) ABSTRACT

A liquid ejection head and a liquid ejection apparatus can join the ejection member to the ejection member joining surface with a sufficient joining area, and suppress a decrease in joining reliability. To this end, second supply ports are provided in side portions of an ejection member.

21 Claims, 12 Drawing Sheets

(56) References Cited

U.S. PATENT DOCUMENTS

| | | | | |
|---|---|---|---|---|
| 2019/0283421 | A1* | 9/2019 | Miyazawa | B41J 2/14233 |
| 2024/0059065 | A1* | 2/2024 | Kato | B41J 2/1404 |

FOREIGN PATENT DOCUMENTS

| | | | |
|---|---|---|---|
| JP | 2017-140806 | A | 8/2017 |
| JP | 2019-010770 | A | 1/2019 |
| JP | 2019-14172 | A | 1/2019 |
| JP | 2021-059023 | A | 4/2021 |
| JP | 2022-088987 | A | 6/2022 |

* cited by examiner

LIQUID EJECTION HEAD AND LIQUID EJECTION APPARATUS

BACKGROUND OF THE INVENTION

Field of the Invention

The present invention relates to a liquid ejection head and a liquid ejection apparatus that eject liquid.

Description of the Related Art

Japanese Patent Laid-Open No. 2019-14172 discloses the following configuration as a liquid ejection head that ejects circulated liquid. In the configuration, a flow passage is formed by stacking multiple plate-shaped members in which through-holes are formed, and the liquid is supplied from a common flow passage to each of liquid ejection element substrates via a pitch conversion flow passage.

In recent years, there is a demand for reducing the width of an ejection element substrate as one means of cost reduction. Moreover, there is a demand for increasing the number of supply ports to improve printing speed and handle high-viscosity liquid.

However, in the case where these demands are handled in the method of Japanese Patent Laid-Open No. 2019-14172, since the flow passage and a joining area between each ejection element substrate and the flow passage member are on the same plane, there is a possibility that the joining area becomes small and joining reliability decreases.

SUMMARY OF THE INVENTION

Accordingly, the present invention provides a liquid ejection head and a liquid ejection apparatus that can suppress a decrease in joining reliability.

A liquid ejection head of the present invention includes: an ejection element plate on which an ejection element is arranged, the ejection element configured to generate energy for ejecting liquid; an ejection port formation member that is stacked on the ejection element plate and that is provided with an individual liquid chamber and an ejection port corresponding to the ejection element; and a first common flow passage that is capable of supplying the liquid to the individual liquid chamber via a first supply port penetrating the ejection element plate, in which a second supply port that supplies the liquid to the first common flow passage in a first direction is arranged in the first common flow passage, the first direction intersecting an ejection direction in which the liquid is ejected from the ejection port.

The present invention can provide a liquid ejection head and a liquid ejection apparatus that can suppress a decrease in joining reliability.

Further features of the present invention will become apparent from the following description of exemplary embodiments with reference to the attached drawings.

DESCRIPTION OF THE EMBODIMENTS

First Embodiment

A first embodiment of the present invention is described below with reference to the drawings.

Figure 1A:
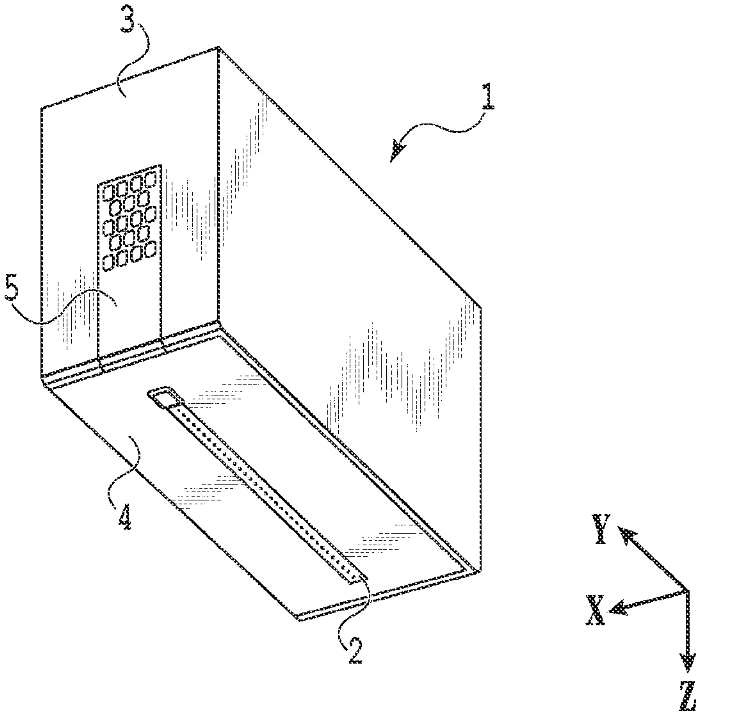
FIG. 1A is a diagram illustrating a liquid ejection head.
Figure 1B:
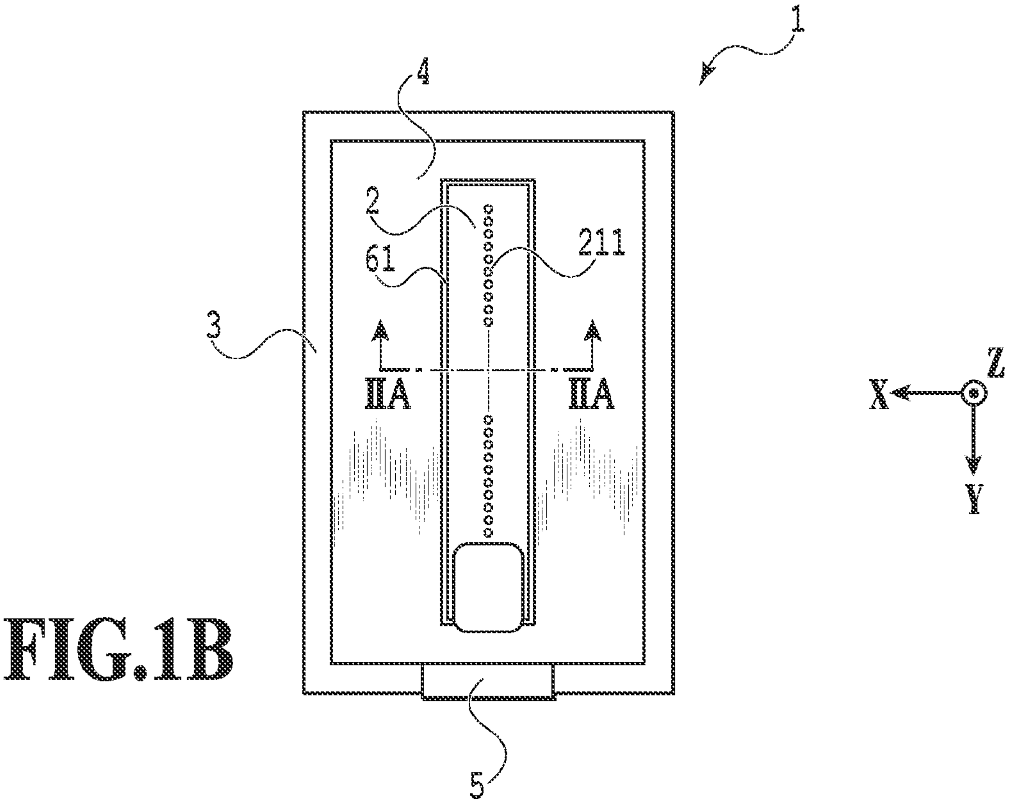
FIG. 1B is a diagram illustrating the liquid ejection head.

FIGS. 1A and 1B are diagrams illustrating a liquid ejection head 1 in the present embodiment, FIG. 1A is a perspective diagram illustrating an ejection member 2 in an understandable manner, and FIG. 1B is a bottom diagram illustrating the ejection member 2 in an understandable manner. In the diagrams described below, an X direction is a width direction of the liquid ejection head 1, a Y direction is an arranging direction of ejection ports that is a direction intersecting the X direction, and a Z direction is an ejection direction of liquid. The liquid ejection head 1 includes the ejection member 2, a flow passage member 3, a face cover 4, and an electric connection member 5. The liquid is supplied from a not-illustrated liquid supply unit connected to the flow passage member 3 to the ejection member 2 by passing through the flow passage member 3, and is collected into the liquid supply unit by passing through the flow passage member 3 again. A liquid ejection apparatus drives ejection elements formed in the ejection member 2 via the electric connection member 5. The ejection elements thereby generate energy for ejection of the liquid, and the liquid is ejected from the ejection ports. A sealing member 61 seals a gap between the face cover 4 and the ejection member 2.

Figure 2A:
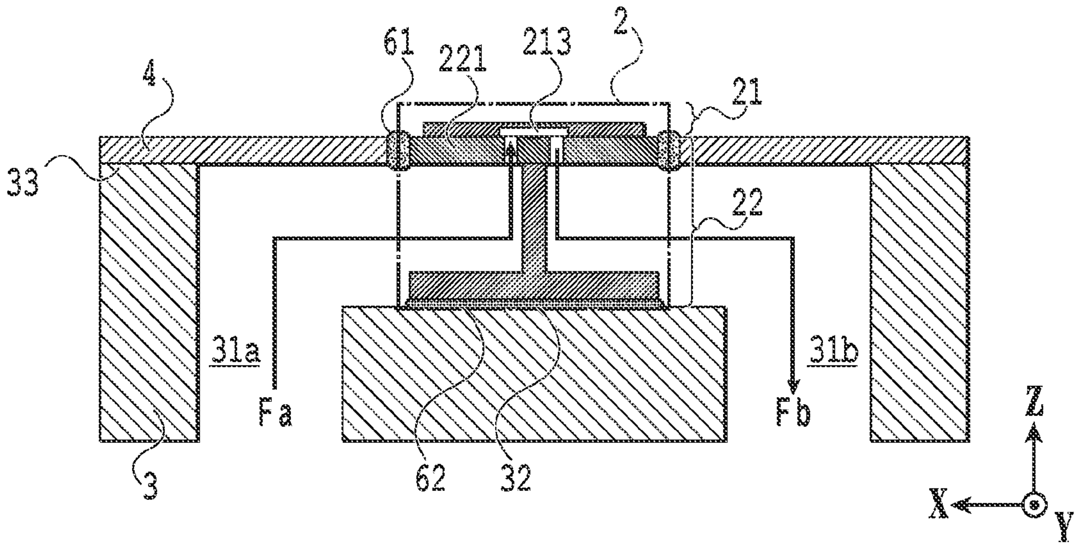
FIG. 2A is a diagram illustrating an ejection member.
Figure 2B:
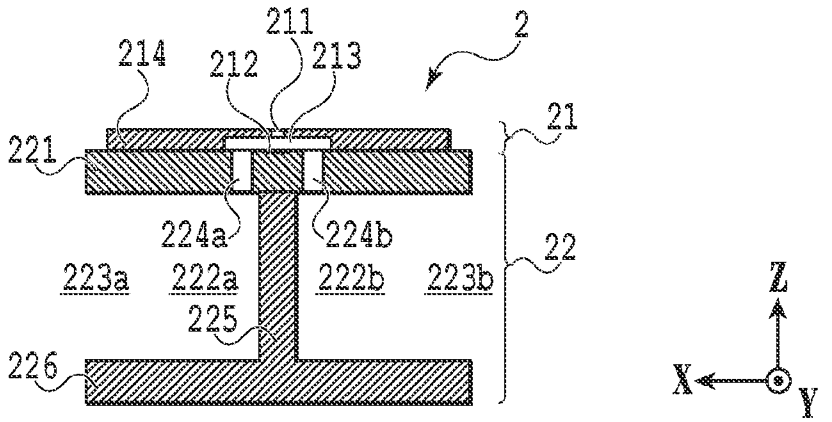
FIG. 2B is a diagram illustrating the ejection member.
Figure 2C:
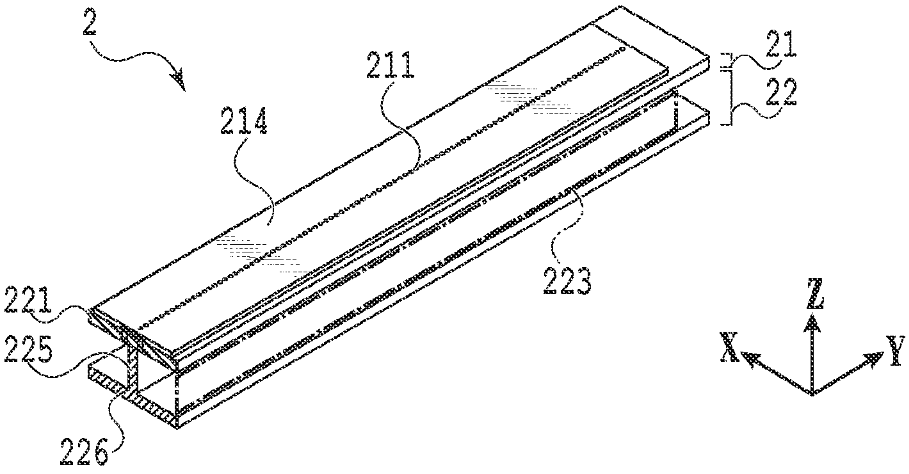
FIG. 2C is a diagram illustrating the ejection member.

FIG. 2A is a cross-sectional diagram along the line IIA-IIA in FIG. 1B, FIG. 2B is a cross-sectional diagram illustrating the ejection member 2, and FIG. 2C is a perspective diagram illustrating the ejection member 2. The arrows Fa and Fb illustrate a flow of the liquid.

In the ejection member 2, an ejection element plate 221 is supported on a bottom surface plate 226, and multiple ejection elements 212 are linearly arranged in the Y direction on the ejection element plate 221 to form an ejection element array. The ejection member 2 is divided into an ejection side region 21 and a back surface side region 22 with a surface on which the ejection elements 212 are formed being a boundary. In the ejection side region 21, an ejection port formation member 214 is formed on the ejection element plate on which the ejection elements 212 are formed, and an individual liquid chamber 213 and an ejection port 211 are provided at a position corresponding to each of the ejection elements 212. In the back surface side region 22, two first common flow passages 222*a* and 222*b* are provided on the opposite surface side of the ejection element plate 221 to the ejection elements 212. The first common flow passages 222*a* and 222*b* are surrounded by a partition 225 provided to stand in the Z direction along the ejection element array and the bottom surface plate 226 provided parallel to the ejection element plate 221.

Moreover, the first common flow passages 222*a* and 222*b* are provided to be capable of supplying the liquid to the individual liquid chambers 213, and communicate with the ejection side region 21 via first flow passage ports 224*a* and 224*b*, provided to penetrate the ejection element plate 221, to allow the liquid to pass. Furthermore, the first common flow passages 222*a* and 222*b* communicate with second common flow passages 31*a* and 31*b* (to be described later) via second flow passage ports 223*a* and 223*b*, provided in both end portions of the ejection member 2 in the X direction in the back surface side region 22, to allow the liquid to pass. The second flow passage ports 223*a* and 223*b* are provided to extend in the Y direction.

In the present embodiment, the ejection element plate 221, the partition 225, and the bottom surface plate 226 use Si as a base material, are bonded to one another in a form of wafers, and are cut out to form the ejection member 2. Bonding of the wafers can achieve high flatness accuracy of bonding surfaces and high registration accuracy. Accordingly, bonding is possible also in a configuration including fine parts such as the first flow passage ports 224 and the partition 225, and joining with high reliability can be performed.

Manufacturing processes of the ejection member 2 are described below. First, the ejection elements 212 and the first flow passage ports 224 are formed such that multiple ejection element plates 221 are arranged on one Si wafer. The ejection port formation member 214 is joined onto this Si wafer, and the individual liquid chamber 213 and the ejection port 211 are formed at positions corresponding to each ejection element 212. The first common flow passages 222 and the second flow passage ports 223 are formed in another Si wafer to be arranged at positions corresponding to the ejection element plates 221 such that portions to be the partition 225 and the bottom surface plate 226 are left.

The two wafers formed as described above are bonded to each other, and individual ejection members 2 are then cut out in a dicing process. The first flow passage ports 224, the first common flow passages 222, and the second flow passage ports 223 are formed by a wet etching or dry etching process. The ejection member 2 is thus formed.

Although the partition 225 and the bottom surface plate 226 are integrally formed in the present embodiment, other configurations may be used. For example, the configuration may be such that the ejection element plate 221 and the partition 225 are formed integrally in the same wafer, and are bonded to a wafer in which the bottom surface plate 226 is formed, and then the individual ejection members are cut out by dicing. Moreover, the configuration may be such that the ejection element plate 221, the partition 225, and the bottom surface plate 226 are formed on separate wafers, respectively, the three wafers are bonded to one another, and then the individual ejection members 2 are cut out by dicing.

The flow passage member 3 is provided with grooves for forming the second common flow passages 31*a* and 31*b*. An ejection member joining surface 32 is provided between these grooves by a recessed step having a depth that is substantially the same as the thickness of the ejection member 2, from a flow passage member ceiling surface 33. The ejection member 2 is joined onto the ejection member joining surface 32 by adhesive 62. Moreover, the face cover 4 having an opening matching an outer shape of the ejection member 2 is joined to the flow passage member ceiling surface 33, and the sealing member 61 seals a gap between the face cover 4 and the ejection member 2.

The aforementioned configuration forms a liquid supply flow passage that is illustrated by the arrow Fa in the drawings and that supplies the liquid to the individual liquid chambers 213 and a liquid collection flow passage that is illustrated by the arrow Fb in the drawings and that is provided to be capable of collecting the liquid from the individual liquid chambers 213.

Figure 3A:
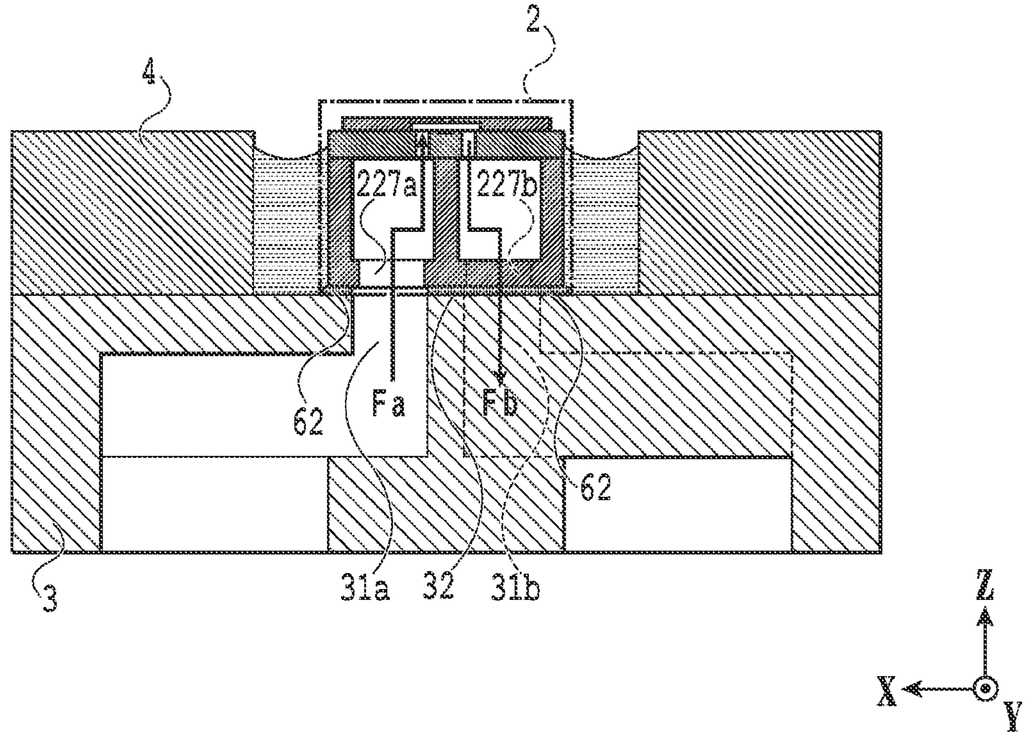
FIG. 3A is a diagram illustrating a comparative example, and is a diagram illustrating a configuration of a liquid ejection head.
Figure 3B:
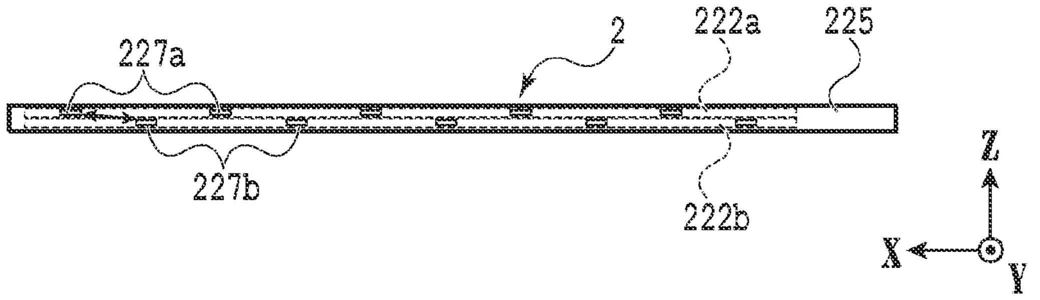
FIG. 3B is a diagram illustrating the comparative example, and is a diagram illustrating the configuration of the liquid ejection head.

FIGS. 3A and 3B are drawings illustrating a comparative example, and are drawings illustrating a general configuration in a conventional circulation-type liquid ejection head. In the general liquid ejection head, second flow passage ports 227 are provided in the bottom surface plate 226. In this case, the flow passage port (supply port) 227*a* on the liquid supply side and the flow passage port (collection port) 227*b* on the liquid collection side are provided on the same plane. In the case where a distance between the flow passage port 227*a* on the liquid supply side and the flow passage port 227*b* on the liquid collection side are small, in the joining of the ejection member 2 and the flow passage member 3 to each other, occurrence of a leak due to insufficient joining or blocking of the flow passage ports due to running over of the adhesive to the flow passage ports 227 is conceivable.

Meanwhile, in the case where a sufficient distance (arrow portion in FIG. 3B) is provided between the flow passage port 227*a* on the liquid supply side and the flow passage port 227*b* on the liquid collection side to secure joining reliability, the number of installable flow passage ports is limited. Accordingly, the distance for which the liquid flows in the first common flow passages increases, and a liquid supply performance in the case where a high-viscosity liquid is used or in the case where the printing is performed at high speed may be insufficient.

Figure 4:
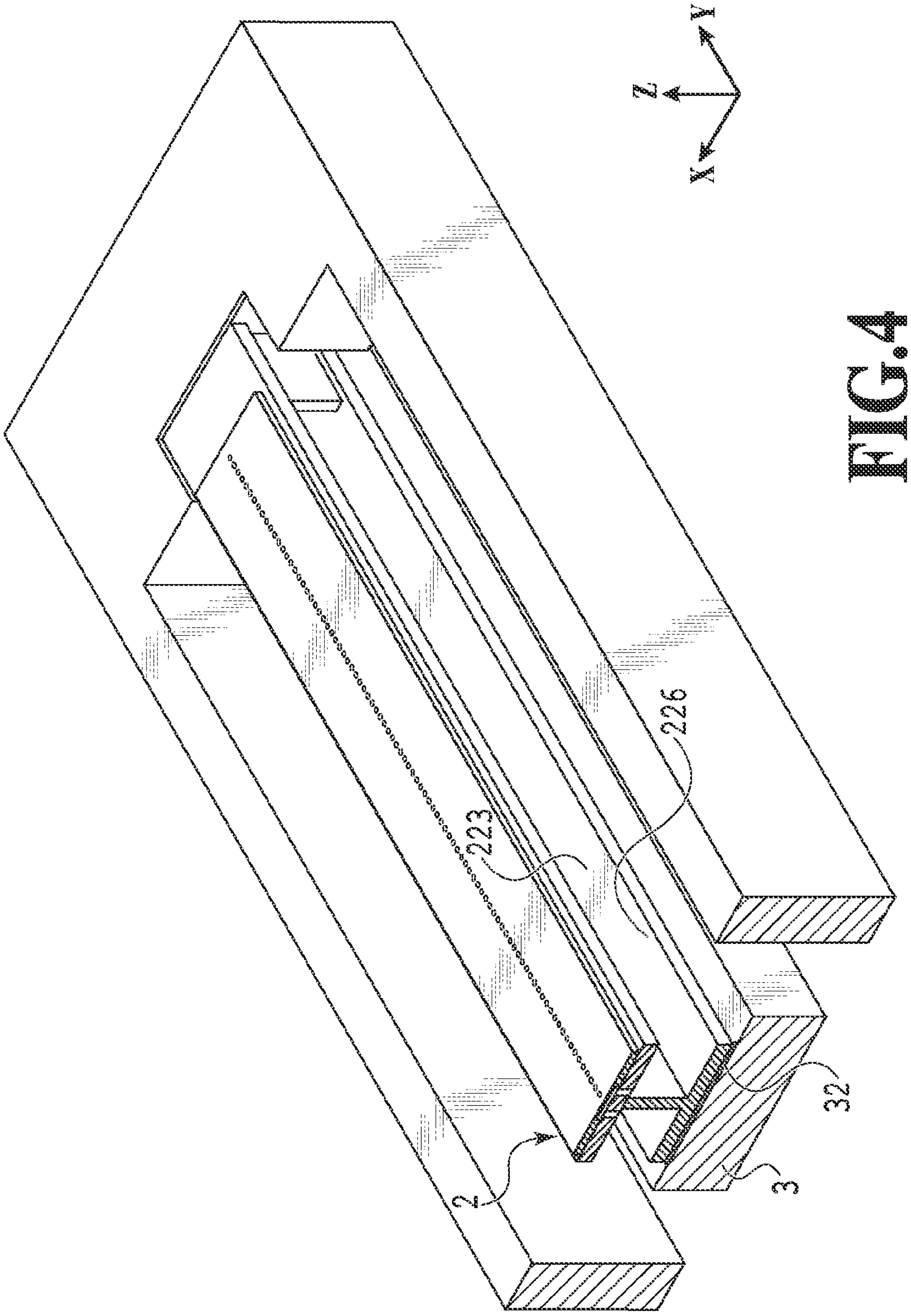
FIG. 4 is a perspective diagram illustrating part of the ejection member and a flow passage member.

FIG. 4 is a perspective diagram illustrating part of the ejection member 2 and the flow passage member 3 in the present embodiment. In order to facilitate viewing, the face cover 4 is not illustrated in FIG. 4. The second flow passage ports 223 are opened over the entire region in the Y direction that is the arranging direction of the ejection ports 211. This can achieve sufficient liquid supply performance also in the case where the high-viscosity liquid is used and the case where the printing is performed at high speed. Moreover, in the ejection member 2 and the flow passage member 3, the ejection member joining surface 32 is bonded to the bottom surface plate 226 of the ejection member 2 over the entire region thereof by adhesive, and a sufficient joining width can be secured. Furthermore, since the second flow passage ports 223 are provided in side portions of the ejection member 2, it is possible to suppress flow-in of the adhesive 62 used for joining of the ejection member 2 and the ejection member joining surface 32.

As described above, according to the configuration of the present embodiment, it is possible to achieve a liquid ejection head having a high liquid supplying performance and high joining reliability.

Note that, in the case where the liquid is supplied from the side portion of the ejection member 2, for example, it is conceivable to provide the flow passage ports on side surfaces of the ejection port formation member 214 that is in the ejection side region 21. However, this is assumed to be unsuitable due to the following points. Specifically, the heights of the individual flow passages and the ejection ports greatly affect the ejection of the liquid, and the dimensions cannot be easily changed. In order to achieve the liquid supply performance corresponding to the high-viscosity liquid or the high-speed printing, it is necessary to secure a certain level of height of the flow passage ports. However, due to relationships with the height of the ejection ports, achieving such a level of height together with the ejection performance is difficult. Moreover, the flow passage needs to be sealed in a very thin region (region with small height), and there are great challenges in manufacturing. Accordingly, a configuration in which the second flow passage ports are provided in the back surface side region 22 as in the present invention is preferable.

As in the present embodiment, the second flow passage ports 223*a* and 223*b* are provided in the side portions of the ejection member 2. This configuration can prevent the second flow passage ports from affecting the joining portion of the ejection member 2 even in the case where the width of an ejection element substrate is reduced, and also allows an increase in the number of flow passage ports to be easily handled.

As described above, according to the present embodiment, it is possible to join the ejection member 2 to the ejection member joining surface 32 with a sufficient joining area, and a liquid ejection head with high reliability can be obtained.

Modified Example 1

Figure 5:
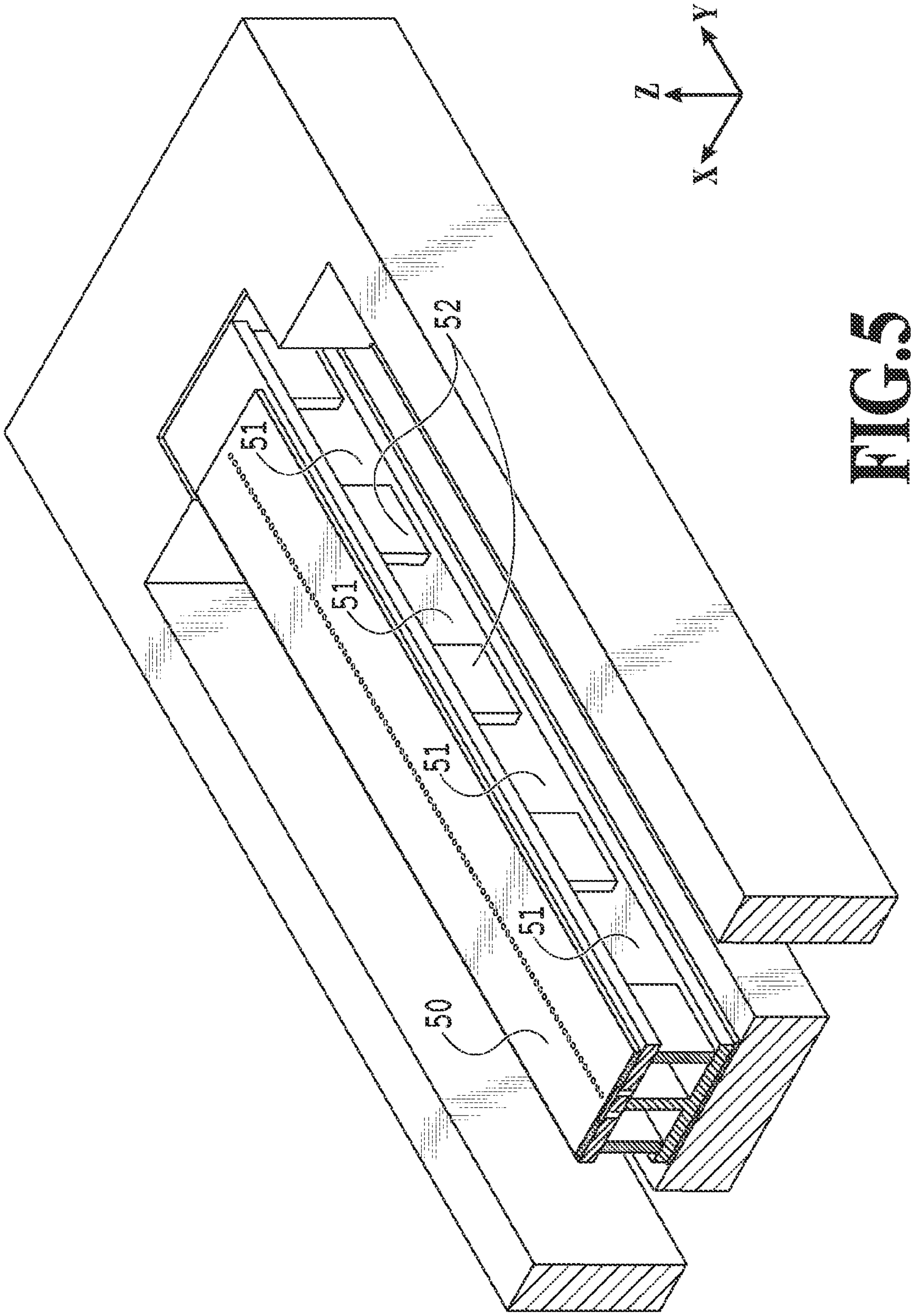
FIG. 5 is a perspective diagram illustrating an ejection member in a modified example and its surroundings.

FIG. 5 is a perspective diagram illustrating an ejection member 50 in Modified Example 1 and its surroundings. Second flow passage ports 51 included in the ejection member 50 are not provided over the entire region of the ejection member 50, but are provided while being divided into multiple ports, and a side wall 52 is provided between each adjacent two of the second flow passage ports 51. Providing the side walls 52 can improve mechanical strength of the ejection member 50. The number of installed second flow passage ports 51 and the dimensions thereof may be determined depending on a balance between the required liquid ejection performance and the required mechanical strength.

Modified Example 2

Figure 6A:
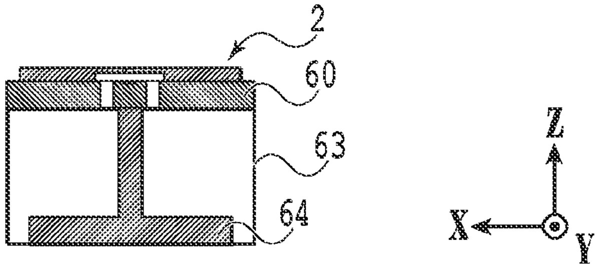
FIG. 6A is a diagram illustrating an ejection member in a modified example and its surroundings.
Figure 6B:
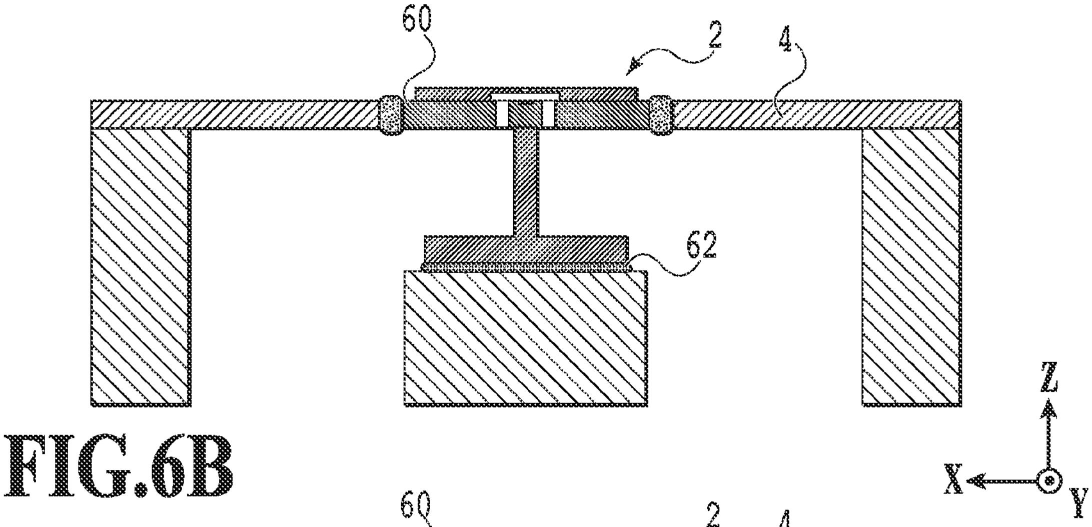
FIG. 6B is a diagram illustrating the ejection member in the modified example and its surroundings.
Figure 6C:
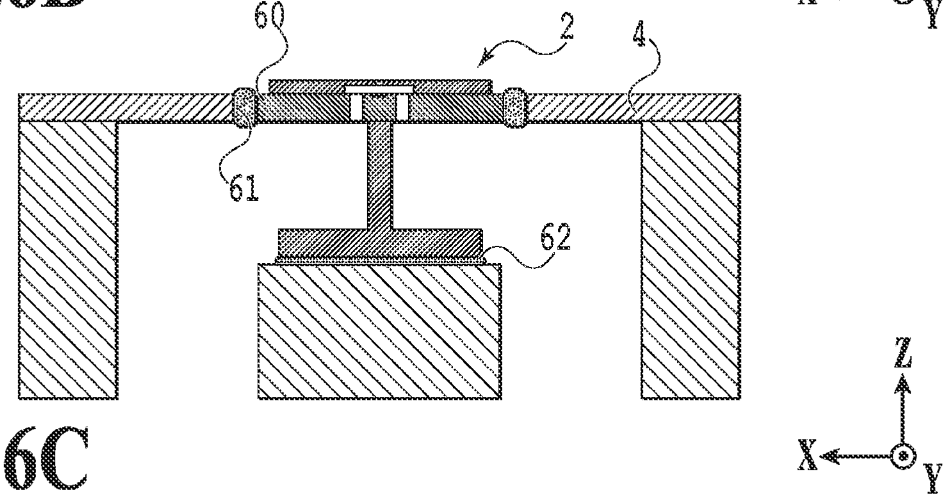
FIG. 6C is a diagram illustrating the ejection member in the modified example and its surroundings.

FIGS. 6A to 6E are diagrams illustrating the ejection member 2 in Modified Example 2 and its surroundings. Second flow passage ports 63 in FIG. 6A are provided to extend from the side portions of the back surface side region 22 and to portions of a bottom surface plate 64. In the case where a sufficient joining area for the bottom surface plate 64 can be secured, such a configuration may be used. Using such a configuration can achieve a high supply performance by securing the width of the second common flow passages as illustrated in FIG. 6B or can reduce the size of the head as a whole including the supply flow passages as illustrated in FIG. 6C.

Figure 6D:
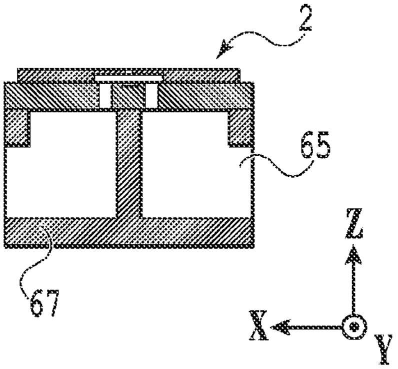
FIG. 6D is a diagram illustrating the ejection member in the modified example and its surroundings.
Figure 6E:
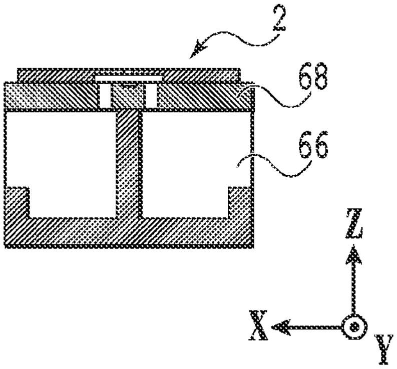
FIG. 6E is a diagram illustrating the ejection member in the modified example and its surroundings.

Moreover, in FIG. 6D, assuming that the ejection direction is the upward direction, second flow passage ports 65 are provided to be shifted toward a bottom surface plate 67 (lower side) and, in FIG. 6E, second flow passage ports 66 are provided to be shifted toward an ejection element plate 68 (upper side). In the case where the sealing member 61 or the adhesive 62 tends to enter the second flow passage ports 65 and 66 due to the dimensions of the parts or the physical properties of the material, using these configurations can suppress the entering.

Modified Example 3

Figure 7A:
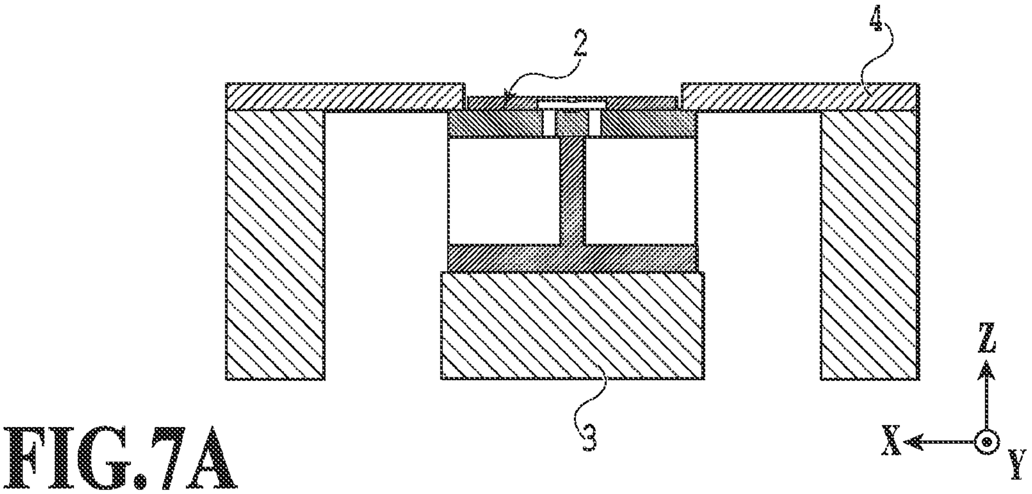
FIG. 7A is a cross-sectional diagram illustrating an ejection member in a modified example and its surroundings.
Figure 7B:
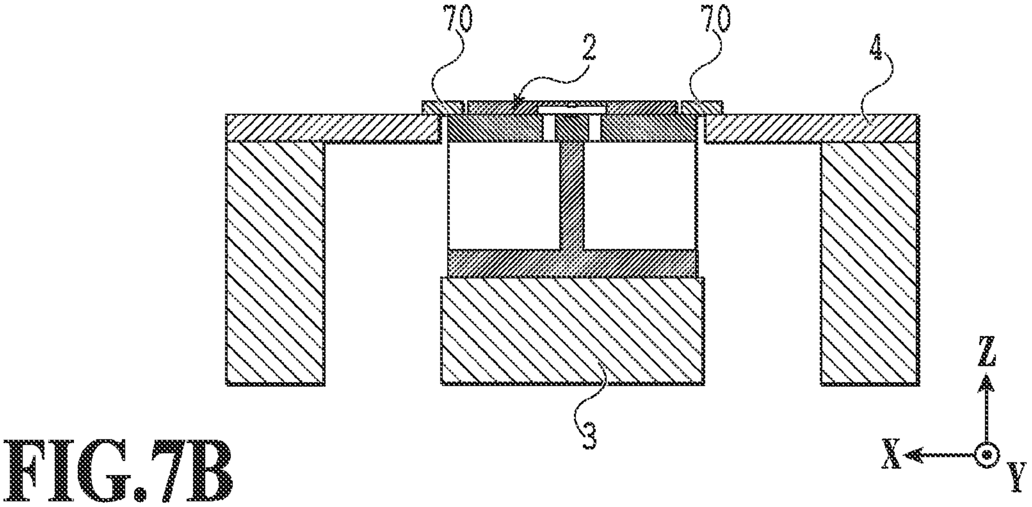
FIG. 7B is a cross-sectional diagram illustrating the ejection member in the modified example and its surroundings.
Figure 7C:
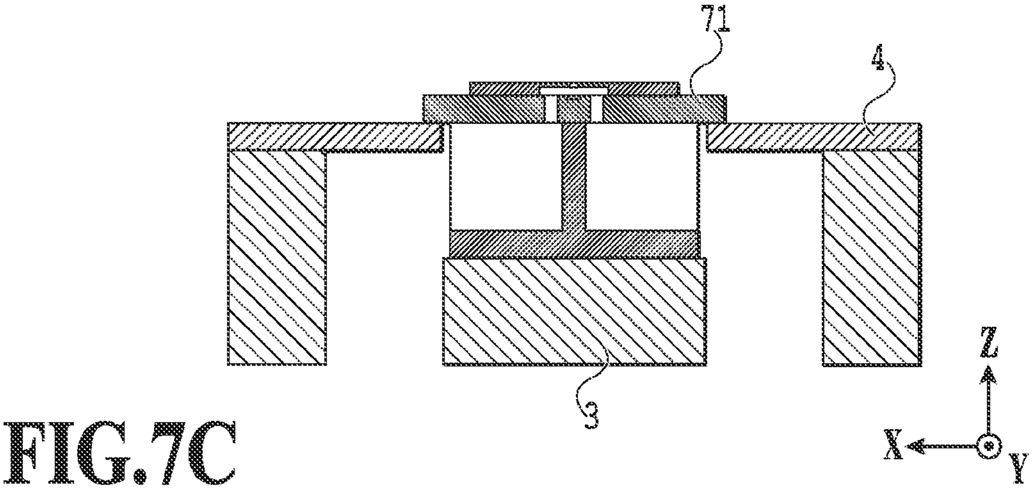
FIG. 7C is a cross-sectional diagram illustrating the ejection member in the modified example and its surroundings.

FIGS. 7A to 7C are cross-sectional diagrams illustrating the ejection member 2 in Modified Example 3 and its surroundings. As illustrated in FIG. 7A, the configuration may be such that the face cover 4 is provided to partially cover an upper surface of the ejection member 2, and the ejection member 2 and the face cover 4 are directly bonded to each other. Moreover, as illustrated in FIG. 7B, the configuration may be such that a bonding film 70 is attached to the gap between the ejection member 2 and the face cover 4 to seal the gap between the ejection member 2 and the face cover 4. Furthermore, as illustrated in FIG. 7C, the configuration may be such that the face cover 4 receives a back surface of an ejection element plate 71, and the ejection element plate 71 and the face cover 4 are directly bonded to each other.

Modified Example 4

Figure 8A:
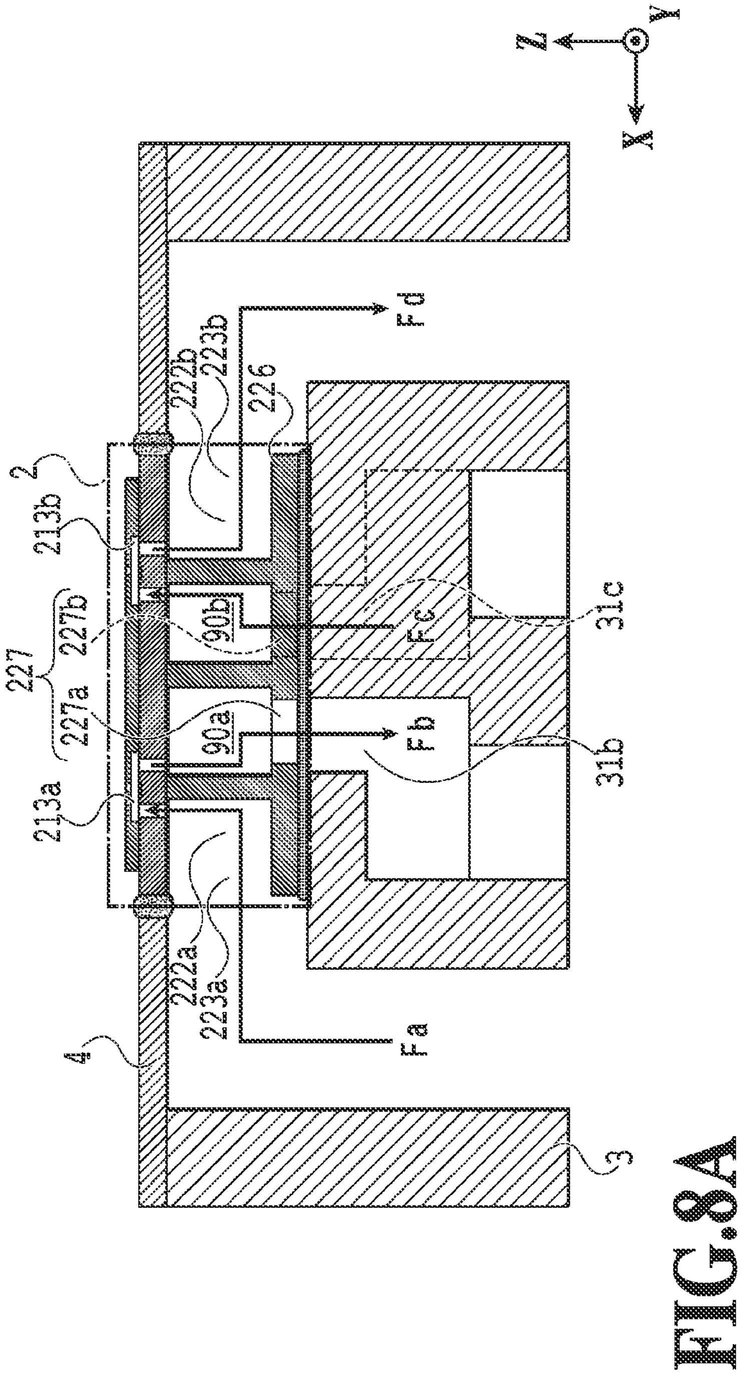
FIG. 8A is a diagram illustrating a case where there are two or more ejection element arrays, as a comparative example.
Figure 8B:
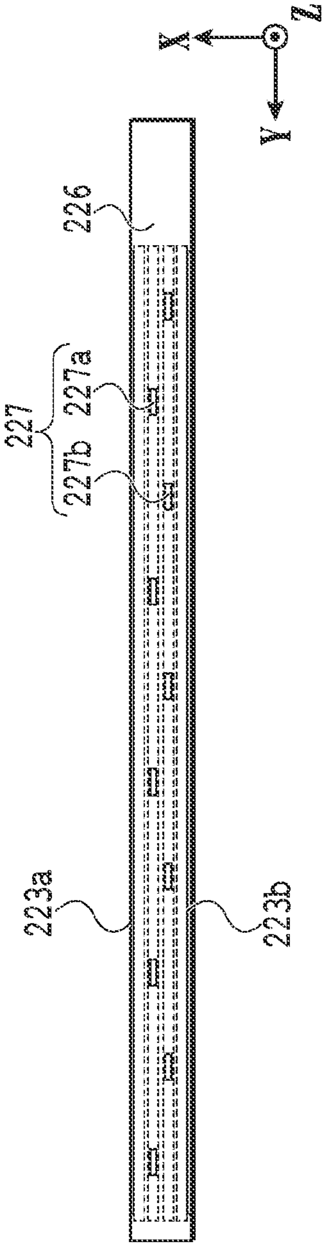
FIG. 8B is a diagram illustrating the case where there are two or more ejection element arrays, as the comparative example.

FIGS. 8A and 8B are diagrams for explaining a configuration in the case where there are two ejection element arrays, as Modified Example 4. FIG. 8A is a cross-sectional diagram illustrating the ejection member 2 and its surroundings, and FIG. 8B is a diagram illustrating the bottom surface plate 226 of the ejection member 2.

In the present modified example, the liquid flowing from a second flow passage port 223*a* into a first common flow passage 222*a* enters an individual liquid chamber 213*a*, and is then collected into a common flow passage 31*b* via a common flow passage 90*a* and a second flow passage port 227*a*. Moreover, the liquid supplied from a common flow passage 31*c* to an individual liquid chamber 213*b* via a second flow passage port 227*b* and a common flow passage 90*b* is then collected from a second flow passage port 223*b* via a first common flow passage 222*b*. As described above, the configuration of the present modified example is applied to provide the second flow passage port 223*a* and the second flow passage port 223*b* corresponding to the outermost ejection element arrays in the side portions. This allows more second flow passage ports 227 to be installed than in the case where the flow passage ports corresponding to all ejection element arrays are provided in the bottom surface plate 226, and higher liquid supply performance can be achieved.

Figure 9A:
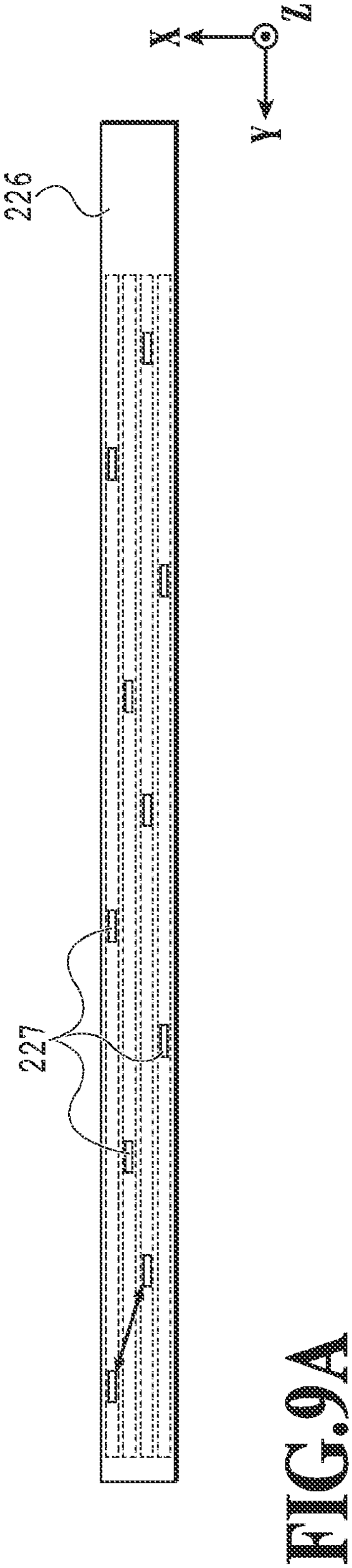
FIG. 9A is a cross-sectional diagram illustrating the ejection member and its surroundings in a case where there are two ejection element arrays.
Figure 9B:
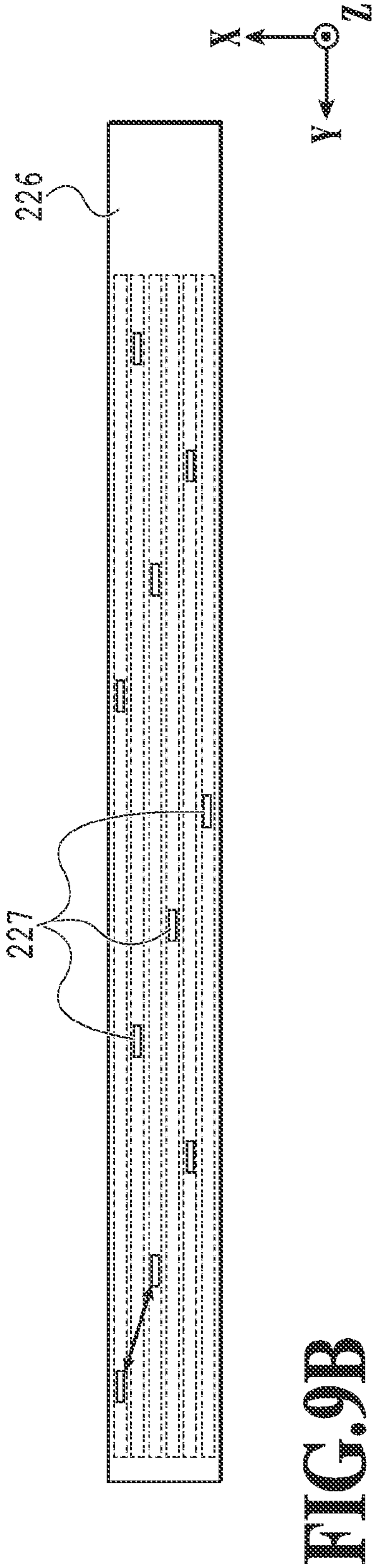
FIG. 9B is a cross-sectional diagram illustrating the ejection member and its surroundings in the case where there are two ejection element arrays.

FIGS. 9A and 9B are diagrams illustrating comparative examples to Modified Example 4. These diagrams illustrate cases where the second flow passage ports corresponding to all ejection element arrays are provided as through-holes in the bottom surface plate. FIG. 9A is a diagram corresponding to two ejection element arrays, and FIG. 9B is a diagram corresponding to three ejection element arrays.

In the case where the second flow passage ports 227 corresponding to all ejection element arrays are provided in the bottom surface plate 226, as the number of the ejection element arrays increases, the number of the second flow passage ports 227 arrangeable for each ejection element array decreases, from the viewpoint of securing the joining area. Moreover, the number of the second flow passage ports 227 arrangeable for each ejection element array in the case corresponding to the three ejection element arrays in FIG. 9B is even smaller than that in the case corresponding to the two ejection element arrays in FIG. 9A.

(Description of Liquid Ejection Apparatus)

Figure 10:
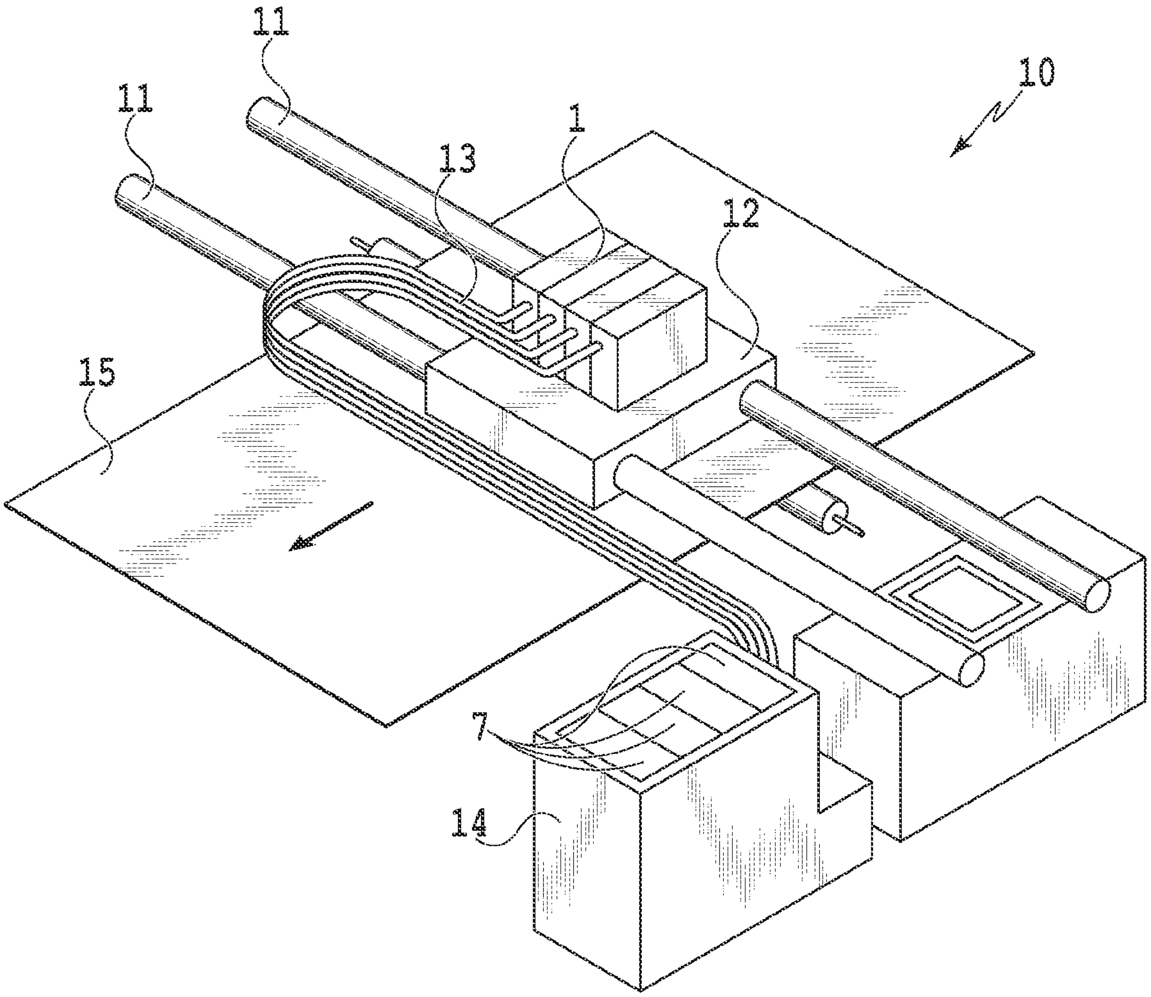
FIG. 10 is a schematic diagram illustrating a liquid ejection apparatus.

FIG. 10 is a schematic diagram illustrating a liquid ejection apparatus 10 to which the present embodiment can be applied. The liquid ejection apparatus 10 includes the liquid ejection head 1 that ejects the liquid, a carriage 12 that is movable along guide rails 11 and in which the liquid ejection head 1 can be mounted, and a supply source 14 that supplies the liquid to the liquid ejection head 1 via supply tubes 13. The liquid ejection head 1 performs printing on a medium 15 by ejecting the liquid to the medium 15 that is conveyed. The liquid ejection head 1 is provided with many ejection ports, and the liquid is ejected from the ejection ports by driving actuators such as heaters.

Second Embodiment

A second embodiment of the present invention is described below with reference to the drawings. Note that, since a basic configuration of the present embodiment is the same as that of the first embodiment, characteristic configurations are described below. The first embodiment has a configuration in which the liquid is circulated by passing the individual liquid chambers 213, while the present embodiment has a configuration in which the liquid in the individual liquid chambers 213 is not collected and the liquid is not circulated.

Figure 11:
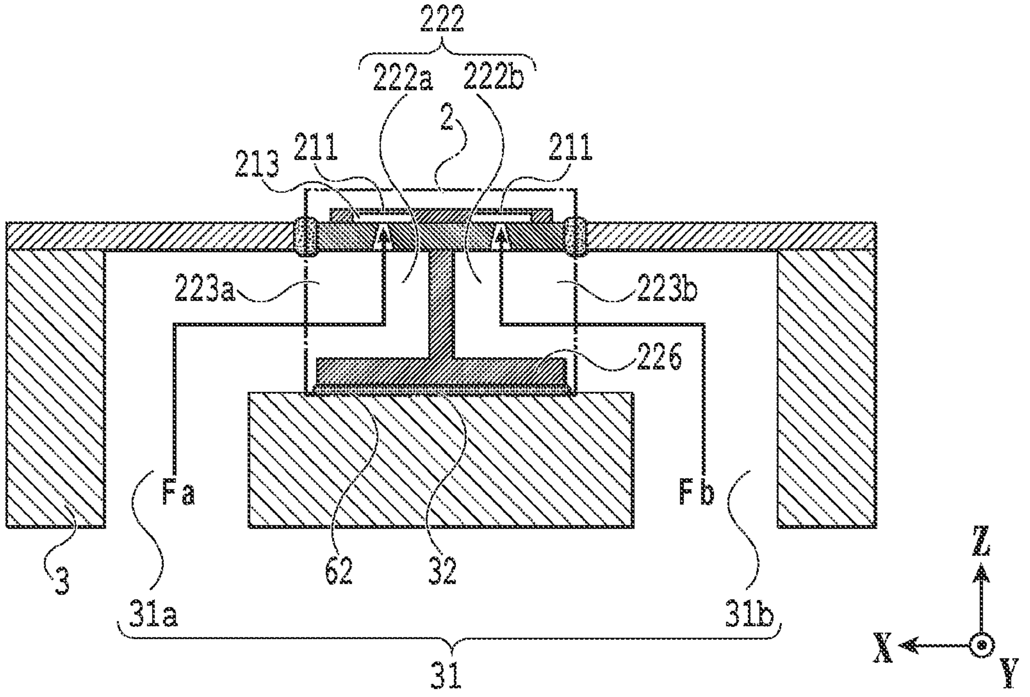
FIG. 11 is a cross-sectional diagram illustrating an ejection member and its surroundings.

FIG. 11 is a cross-sectional diagram illustrating the ejection member 2 in the present embodiment and its surroundings. One first common flow passage 222 and one second common flow passage 31 are provided for each of the two ejection element arrays. Different types of liquid are supplied to the two ejection element arrays, respectively, through routes of Fa and Fb. Also in the present embodiment, the second flow passage ports 223*a* and 223*b* are provided in the side portions of the ejection member 2, and this allows the ejection member 2 and the flow passage member 3 to be joined to each other over the entire region of the bottom surface plate 226.

This can achieve a liquid ejection head that can achieve both high joining reliability and a high liquid ejection performance even in the case where the size of the ejection member 2 is reduced.

Modified Example 5

Figure 12A:
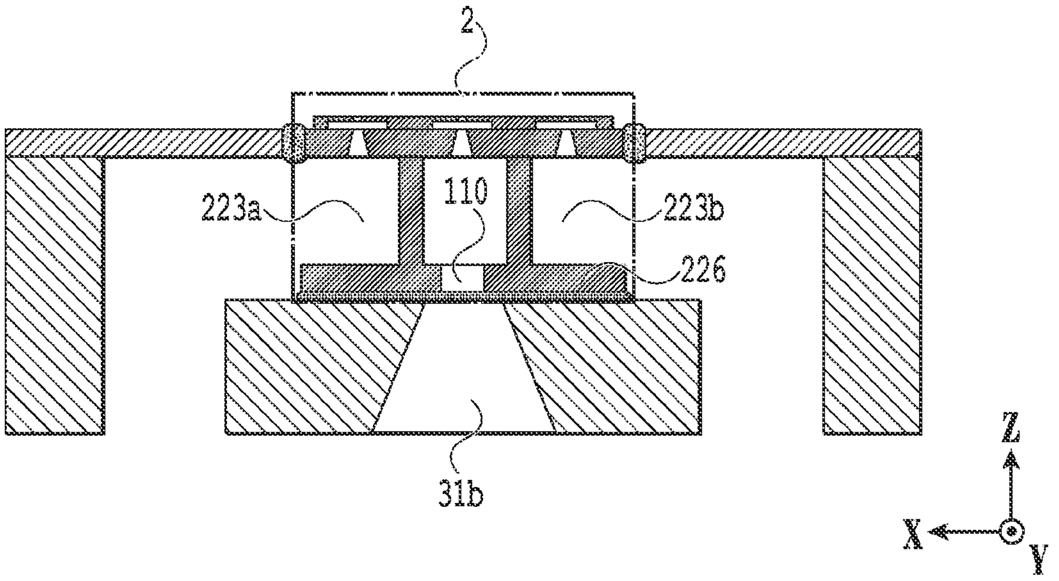
FIG. 12A is a cross-sectional diagram illustrating a liquid ejection head including three or more ejection element arrays.
Figure 12B:
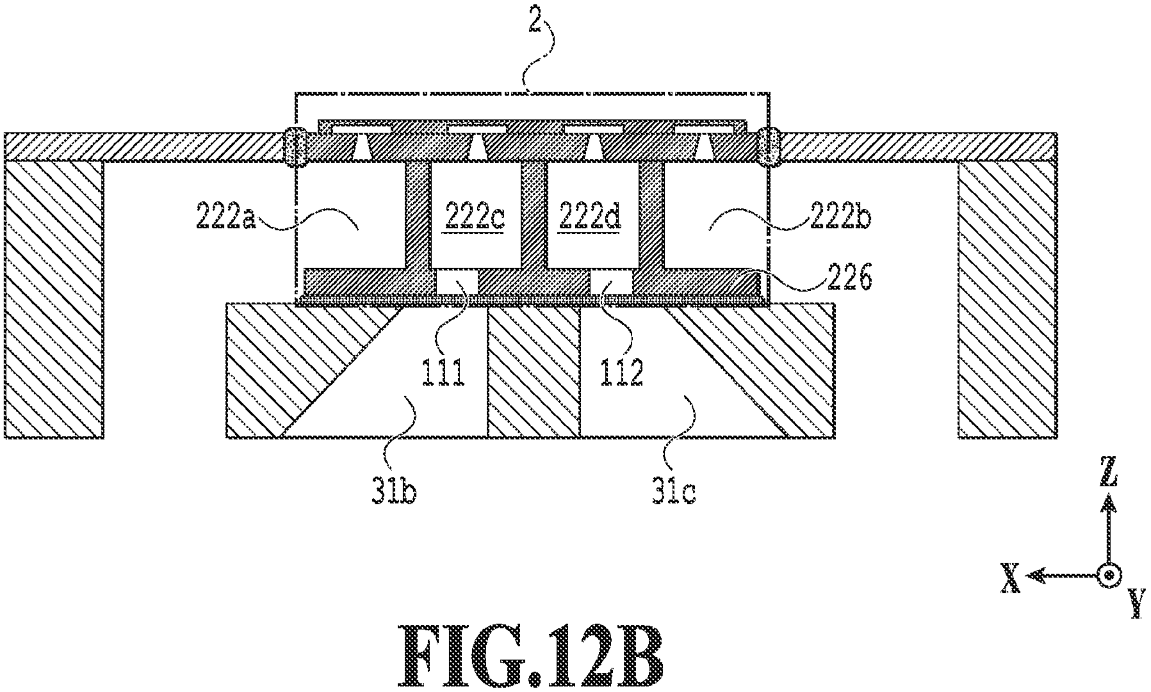
FIG. 12B is a cross-sectional diagram illustrating a liquid ejection head including three or more ejection element arrays.

FIGS. 12A and 12B are each a cross-sectional diagram illustrating a liquid ejection head including three or more ejection element arrays in the configuration in which the liquid is not circulated. In FIG. 12A, the liquid ejection head includes three ejection element arrays and, in FIG. 12B, the liquid ejection head includes four ejection element arrays. In the case where the liquid ejection head includes three ejection element arrays as illustrated in FIG. 12A, a second flow passage port 110 corresponding to the ejection element array located at the center is provided in the bottom surface plate 226, and the second flow passage ports 223*a* and 223*b* corresponding to the two ejection element arrays on the outer sides are provided in the side portions. The liquid to the second flow passage port 110 is supplied from a common flow passage 31*b*.

Moreover, in the case where four ejection element arrays are provided as in FIG. 12B, the liquid is supplied from second flow passage ports 111 and 112 provided in the bottom surface plate, to common flow passages 222*c* and 222*d* interposed between the first common flow passages 222*a* and 222*b* on the outer sides. From the viewpoint of securing the joining area, the second flow passage ports 111 and 112 corresponding to the two ejection element arrays located at the center are arranged to be shifted toward the first common flow passages 222*a* and 222*b* on the outer sides, respectively. The liquid is supplied from the common flow passage 31*b* to the common flow passage 222*c* via the second flow passage port 111, and the liquid is supplied from the common flow passage 31*c* to the common flow passage 222*d* via the second flow passage port 112. This can secure a larger joining area than that in the case where the second flow passage ports corresponding to all arrays are provided in the bottom surface plate, and can achieve a liquid ejection head that can achieve both of high joining reliability and a high liquid supply performance.

Other Embodiments

The embodiments and modified examples described above can be carried out while being appropriately combined with one another as long as such a combination is possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-132814 filed Aug. 23, 2022, which is hereby incorporated by reference herein in its entirety.

What is claimed is:

1. A liquid ejection head comprising:

an ejection element plate on which an ejection element is arranged, the ejection element configured to generate energy for ejecting liquid;

an ejection port formation member that is stacked on the ejection element plate and that is provided with an individual liquid chamber and an ejection port corresponding to the ejection element; and a first common flow passage that is capable of supplying the liquid to the individual liquid chamber via a first supply port penetrating the ejection element plate and that includes three surfaces which are a first surface on which the first supply port of the ejection element plate is opened, a second surface opposite to the first surface, and a third surface connecting the first surface and the second surface, wherein a second supply port that is capable of supplying the liquid to the first common flow passage in a first direction and that is opened opposite the third surface is arranged in the first common flow passage, the first direction intersecting an ejection direction in which the liquid is ejected from the ejection port.

2. The liquid ejection head according to claim 1, wherein a plurality of the ejection elements are arranged on the ejection element plate in a second direction intersecting the first direction and the ejection direction, and the first common flow passage extends along the second direction.

3. The liquid ejection head according to claim 1, further comprising a second common flow passage that is capable of collecting the liquid from the individual liquid chamber via a first collection port penetrating the ejection element plate, wherein the liquid in the second common flow passage is collected in the first direction via a second collection port.

4. The liquid ejection head according to claim 2, wherein a first ejection element array and a second ejection element array in which the plurality of ejection elements are arranged in the second direction are arranged on the ejection element plate in the first direction, the first common flow passage and a second common flow passage that is provided along the first common flow passage and that is capable of collecting the liquid from a first individual liquid chamber corresponding to the ejection element of the first ejection element array via a first collection port penetrating the ejection element plate are provided in such a way that the first common flow passage and the second common flow passage correspond to the first ejection element array, a third common flow passage that is capable of supplying the liquid to a second individual liquid chamber corresponding to the ejection element of the second ejection element array via a third supply port penetrating the ejection element plate and that is provided along the second common flow passage and a fourth common flow passage that is capable of collecting the liquid from the second individual chamber via a second collection port penetrating the ejection element plate and that includes three surfaces which are the first surface on which the second collection port of the ejection element plate is opened, the second surface opposite to the first surface, and a fourth surface connecting the first surface and the second surface are provided in such a way that the third common flow passage and the fourth flow passage correspond to the second ejection element array, the liquid in the second common flow passage is collected in a direction opposite to the ejection direction via a third collection port provided on the second surface, the liquid is supplied to the third common flow passage in a direction along the ejection direction via a fourth supply port provided on the second surface, and the liquid in the fourth common flow passage is collected in the first direction via a fourth collection port that is opened opposite the fourth surface.

5. The liquid ejection head according to claim 2, wherein a first ejection element array and a second ejection element array in which the plurality of ejection elements are arranged in the second direction are arranged on the ejection element plate in the first direction, each of the first ejection element array and the second ejection element array is provided with the first supply port and the first common flow passage, the liquid is supplied to the first common flow passage of the first ejection element array via the second supply port arranged in the first direction, and the liquid is supplied to the first common flow passage of the second ejection element array in an opposite direction to the first direction via a third supply port.

6. The liquid ejection head according to claim 2, wherein a first ejection element array, a second ejection element array, and a third ejection element array in which the plurality of ejection elements are arranged in the second direction are arranged on the ejection element plate in the first direction in the order as listed, the first common flow passage is provided in such a way that the first common flow passage corresponds to the first ejection element array, a second common flow passage is provided along the first common flow passage in such a way that the second common flow passage corresponds to the second ejection element array, a third common flow passage is provided along the second common flow passage in such a way that the third common flow passage corresponds to the third ejection element array, the liquid is supplied to the first common flow passage in the first direction via the second supply port, the liquid is supplied to the second common flow passage along the ejection direction, and the liquid is supplied to the third common flow passage in an opposite direction to the first direction via a third supply port.

7. The liquid ejection head according to claim 2, wherein the second supply port is opened over an entire region of the ejection port array in which the ejection ports are arranged along the second direction.

8. The liquid ejection head according to claim 2, wherein a plurality of the second supply ports are provided along the second direction.

9. The liquid ejection head according to claim 1, wherein the ejection element plate is supported by a bottom surface plate including a surface parallel to the ejection element plate, and the bottom surface plate is joined to a flow passage member that is capable of supplying the liquid to the first common flow passage.

10. The liquid ejection head according to claim 6, wherein the ejection element plate is supported by a bottom surface plate including a surface parallel to the ejection element plate, and the liquid is supplied to the second common flow passage along the ejection direction via a through-hole formed in the bottom surface plate.

11. The liquid ejection head according to claim 6, wherein the second ejection element array includes a fourth ejection element array and a fifth ejection element array in which the plurality of ejection elements are arranged.

12. The liquid ejection head according to claim 11, further comprising a bottom surface plate that supports the ejection element plate and that includes a surface parallel to the ejection element plate, wherein the liquid is supplied to a common flow passage of the fourth ejection element array via a supply port provided to penetrate the bottom surface plate, and the liquid is supplied to a common flow passage of the fifth ejection element array via a supply port provided to penetrate the bottom surface plate.

13. The liquid ejection head according to claim 12, wherein the supply port is provided in the common flow passage of the fourth ejection element array so as to be shifted toward the first common flow passage, and the supply port is provided in the common flow passage of the fifth ejection element array so as to be shifted toward the common flow passage of the third ejection element array.

14. The liquid ejection head according to claim 3, wherein in the case where the ejection direction is an upward direction, the second supply port is provided to be shifted toward the upper side of the first common flow passage, and the second collection port is provided to be shifted toward the upper side of the second common flow passage.

15. The liquid ejection head according to claim 3, wherein in the case where the ejection direction is an upward direction, the second supply port is provided to be shifted toward the lower side of the first common flow passage, and the second collection port is provided to be shifted toward the lower side of the second common flow passage.

16. The liquid ejection head according to claim 1, wherein a periphery of the ejection element plate is surrounded by a face cover.

17. The liquid ejection head according to claim 16, wherein a gap between the ejection element plate and the face cover is sealed by a sealing member.

18. The liquid ejection head according to claim 16, wherein the face cover covers the periphery of the ejection element plate.

19. The liquid ejection head according to claim 16, wherein a bonding film is attached between the ejection element plate and the face cover.

20. The liquid ejection head according to claim 16, wherein the ejection element plate covers an end portion of the face cover.

21. A liquid ejection apparatus in which a liquid ejection head is configured to be mounted, the liquid ejection head comprising:

an ejection element plate on which an ejection element is arranged, the ejection element configured to generate energy for ejecting liquid;

an ejection port formation member that is stacked on the ejection element plate and that is provided with an individual liquid chamber and an ejection port corresponding to the ejection element; and a first common flow passage that is capable of supplying the liquid to the individual liquid chamber via a first supply port penetrating the ejection element plate and that includes three surfaces which are a first surface on which the first supply port of the ejection element plate is opened, a second surface opposite to the first surface, and a third surface connecting the first surface and the second surface, wherein a second supply port that is capable of supplying the liquid to the first common flow passage in a first direction and that is opened opposite the third surface is arranged in the first common flow passage, the first direction intersecting an ejection direction in which the liquid is ejected from the ejection port.

* * * * *